Figure 1:
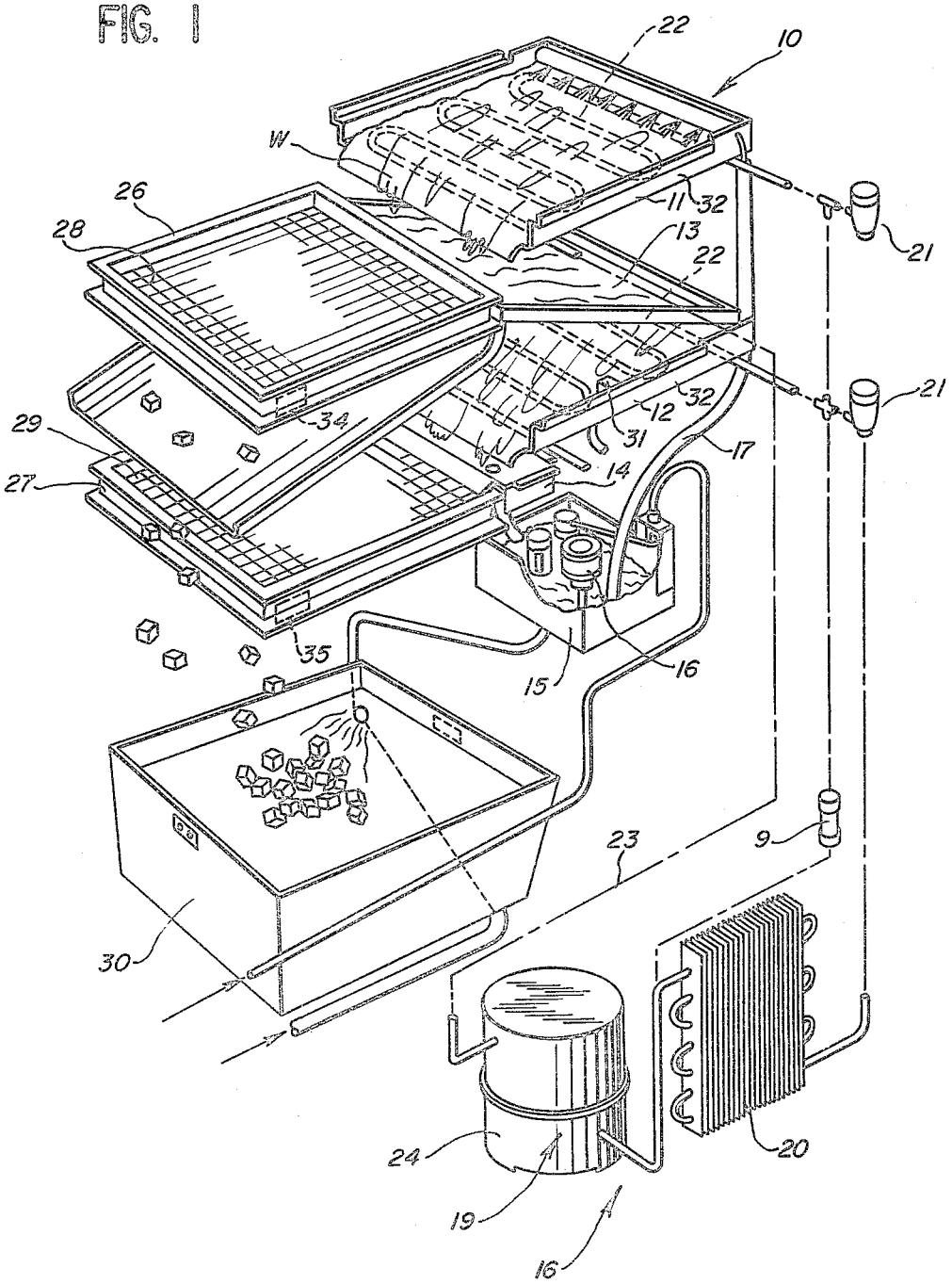
Figure 2:
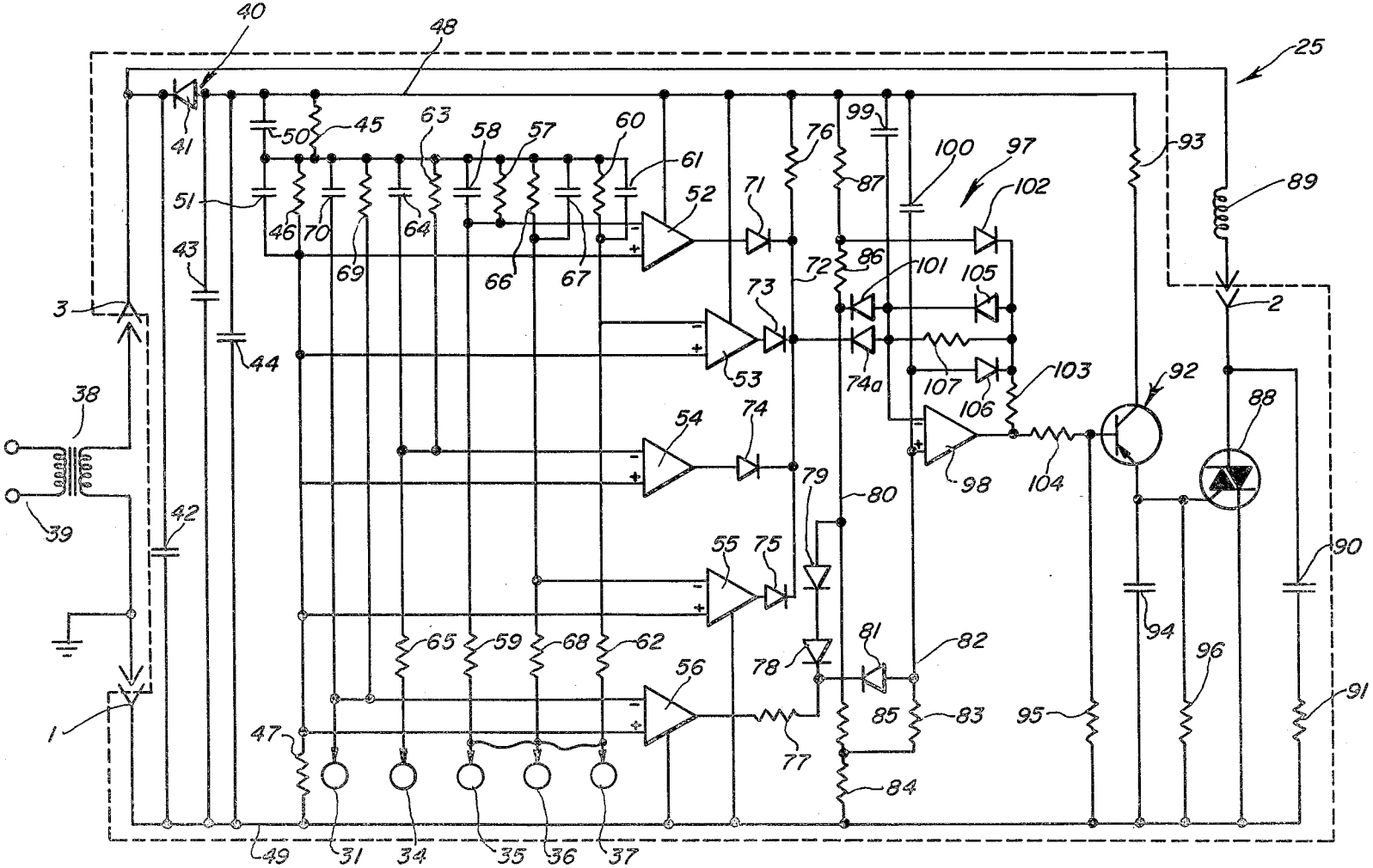
Figure 3:
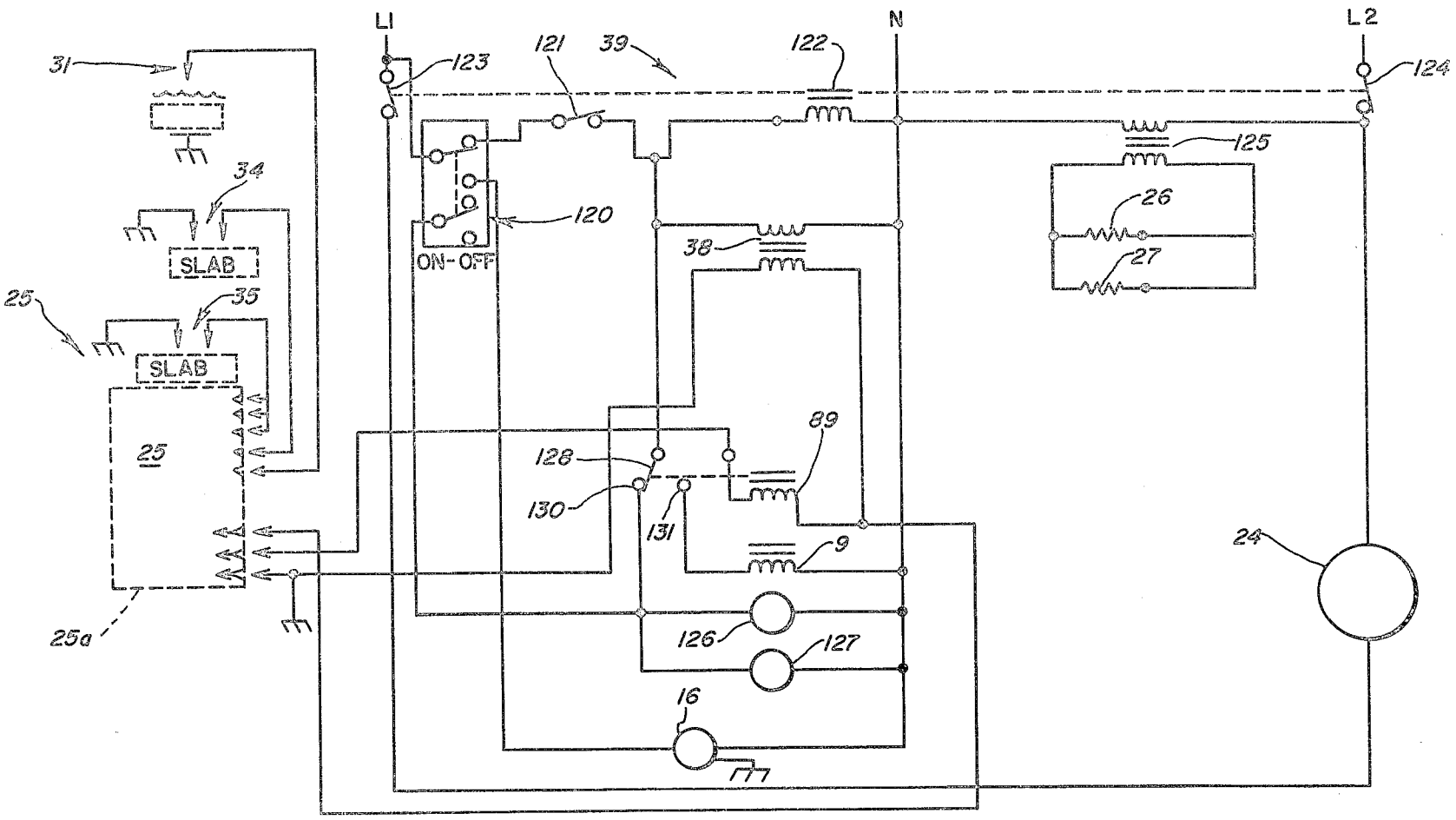

United States Defensive Publication [19] (H) [11] T103,001

Marks [43] May 3, 1983

[54] SLAB-TYPE ICE MAKER CONTROL

[76] Inventor: James R. Marks, 720 Oxborough Dr., Perrysburg, Ohio 43551

[21] Appl. No.: 395,360

[22] Filed: Jul. 6, 1982

[51] Int. Cl.[3] ..... G01K 13/00

[52] U.S. Cl. ..... 62/139; 62/348

[57] ABSTRACT

A control for use in a slab-type ice maker wherein slabs of ice are formed on refrigerated plates by the circulation of water thereover. The control includes sensors for detecting the thickness of the slabs on the plates and causing termination of the ice forming cycle and initiation of an ice transfer or harvest cycle wherein the plates are heated, permitting the slabs of ice to pass downwardly therefrom onto cutting grids for cutting of the ice slabs into a plurality of smaller ice bodies. The sensors utilize a small current detected when the ice slab reaches a preselected thickness as a signal for effecting the automatic operation. Further sensors are associated with the cutting grids for detecting the presence of ice slabs thereon. The control functions to prevent termination of the ice making cycle until such time as at least one of the cutting grids has no ice thereon. The control further continues the harvest cycle in the event less than all of the cutting grids have ice transferred thereto during the harvest cycle. After a preselected period of time, the harvest cycle is terminated regardless of whether or not ice has been transferred to all of the cutting grids and ice forming operation is re-initiated.

16 Claims, 3 Sheets Drawing,

24 Pages Specification

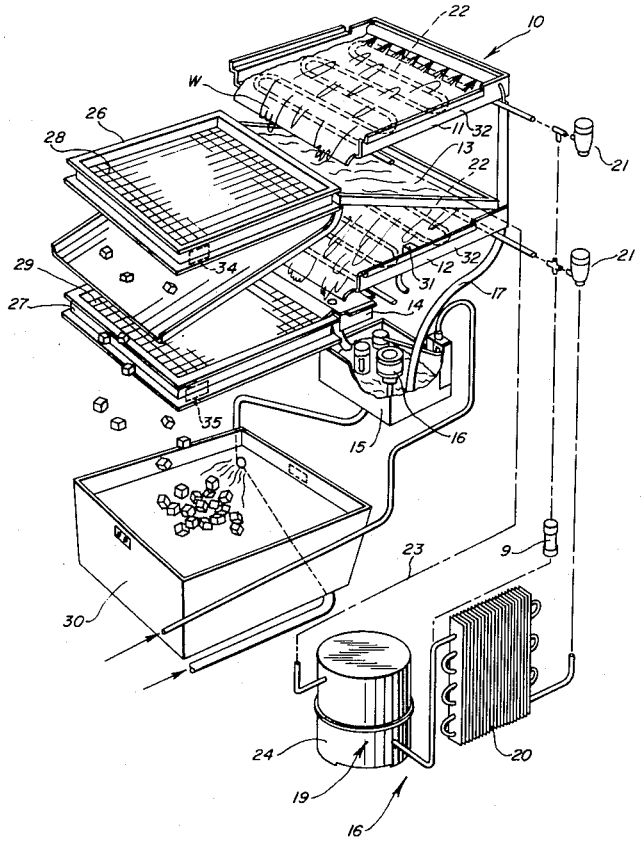

The file of this unexamined application may be inspected and copies thereof may be purchased (849 O.G. 1221, Apr. 9, 1968).